United States Patent [19]
Klemm et al.

[11] Patent Number: 5,692,736
[45] Date of Patent: Dec. 2, 1997

[54] METHOD FOR VIBRATION DAMPING OF WORKPIECE TRANSPORT DEVICE DRIVEN ELEMENTS

[75] Inventors: Peter Klemm, Stuttgart; Hilmar Rudloff, Koengen, both of Germany

[73] Assignee: Schuler Pressen GmbH & Co., Germany

[21] Appl. No.: 505,536

[22] Filed: Jul. 21, 1995

[30] Foreign Application Priority Data

Jul. 21, 1994 [DE] Germany ............ 44 25 739.2

[51] Int. Cl.$^6$ .................................... B23Q 7/00
[52] U.S. Cl. .................................... 267/137
[58] Field of Search .................. 188/378; 267/136, 267/137, 140.15, 75, 119, 130

[56] References Cited

U.S. PATENT DOCUMENTS

| | | | |
|---|---|---|---|
| 3,552,271 | 1/1971 | Suggs | 267/136 X |
| 4,101,009 | 7/1978 | Hehl et al. | 267/137 X |
| 4,198,845 | 4/1980 | Sofy | 74/421 |
| 4,858,459 | 8/1989 | Takahashi | 267/137 X |
| 5,020,781 | 6/1991 | Huang | 267/136 |
| 5,255,764 | 10/1993 | Kurabayashi et al. | 267/136 X |
| 5,374,025 | 12/1994 | Whelpley et al. | 267/136 X |

FOREIGN PATENT DOCUMENTS

| | | |
|---|---|---|
| 22 00 754 | 5/1979 | Germany. |
| 30 04 861 A1 | 8/1981 | Germany. |
| 4319715 | 11/1992 | Japan. |
| WO 94/21403 | 9/1994 | WIPO. |

*Primary Examiner*—Peter M. Poon
*Attorney, Agent, or Firm*—Evenson, McKeown, Edwards & Lenahan, P.L.L.C.

[57] ABSTRACT

A method serves to actively perform vibration damping of driven elements of workpiece transport devices in and on shaping machines, especially presses and punches. A measured state value of the driven element or one reconstructed by an observer is determined. The state value is then entered into a damping regulator which affects the drive of the driven elements. A damping regulating circuit is provided in addition to a position regulating circuit.

10 Claims, 3 Drawing Sheets

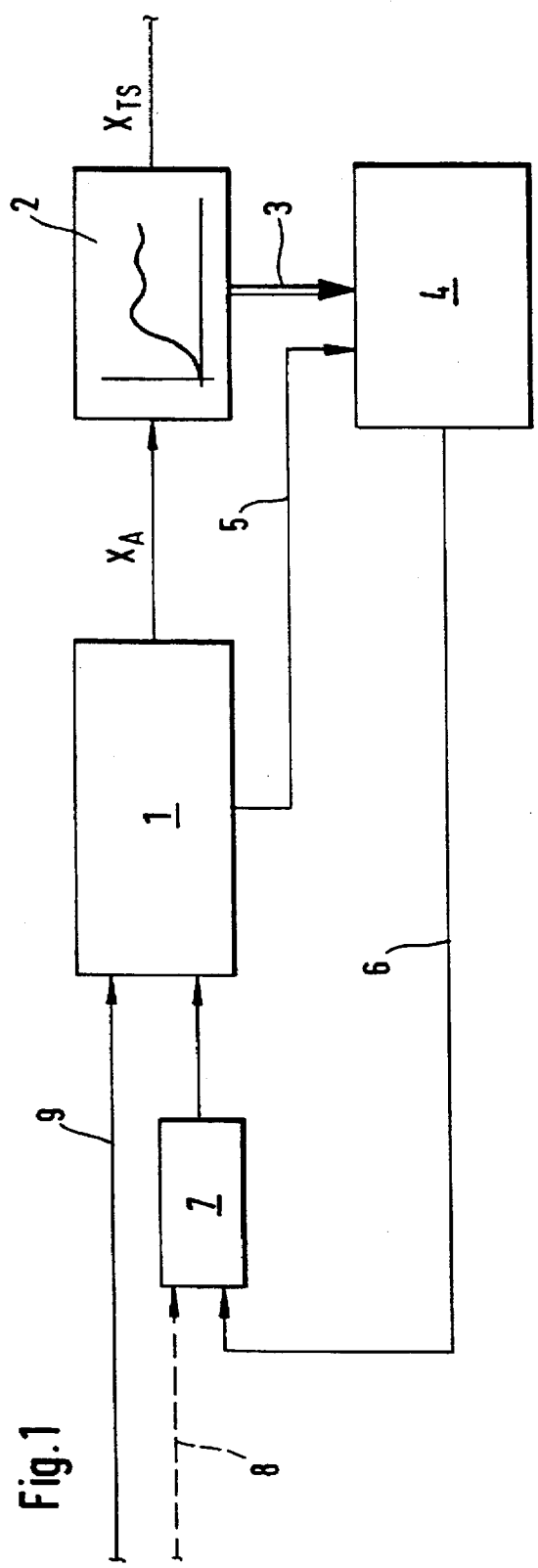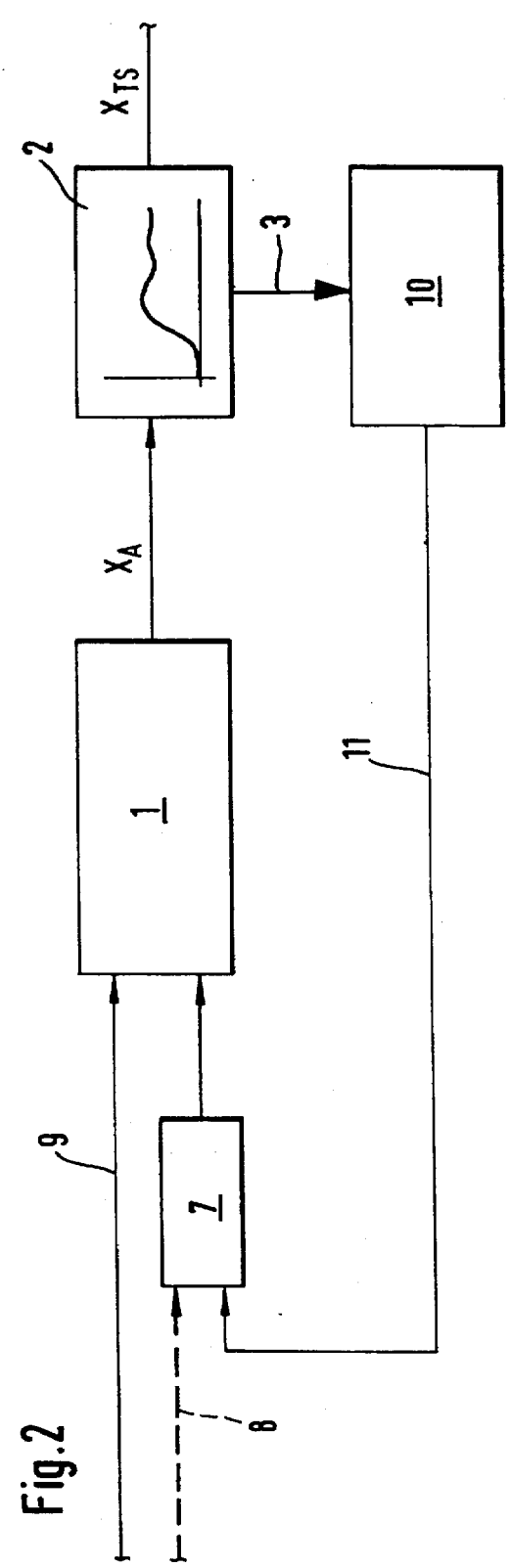

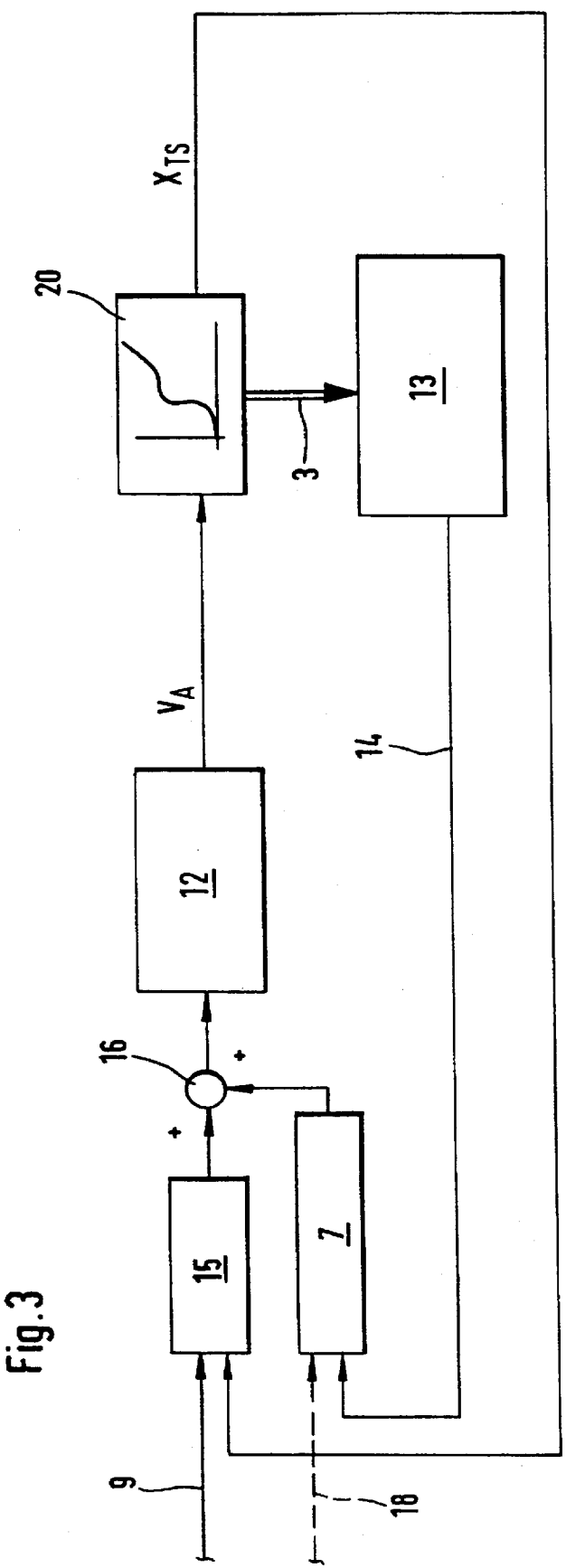

1

METHOD FOR VIBRATION DAMPING OF WORKPIECE TRANSPORT DEVICE DRIVEN ELEMENTS

BACKGROUND AND SUMMARY OF THE INVENTION

The present invention relates to a method for vibration damping of driven elements of workpiece transport devices in and on shaping machines, particularly presses and punches.

The mechanical parts of electrically driven elements of workpiece transport devices in and on shaping machines, especially presses and punches, must be as rigid and vibration-damping as possible because of the acceleration forces that develop, the weight of the elements, the vibrational excitations caused by the drives of the elements, and the vibration of the press.

Because of these requirements, the mechanical elements are usually cumbersome and expensive. For example, in order to keep the masses to be moved low, fiber-bonded materials are used to achieve the desired stiffness of the mechanical elements.

To achieve this goal, mechanical damping devices are known in practice. Thus, for example, DE-PS 30 04 862 discloses a transfer device for transporting workpieces from station to station on a press, which has a braking device that counteracts the rotational movement of a shaft.

German Patent 22 00 754 discloses a drive for gripper rail lengthwise movement on mechanical presses, especially transfer presses, in which the individual masses of the components to be moved as well as the distances to be traveled are kept as low as possible. Thus, even when it is used on presses with a high number of strokes, for example high-speed transfer presses, quiet, low-vibration operation with low wear of the transmission elements is sought to be achieved.

However, a disadvantage of the above-mentioned approaches for achieving the goal is that the devices are complex and hence expensive to manufacture and install.

The present invention therefore has as its object a method for vibration damping of driven elements of workpiece transport devices in and on shaping machines, which is both economical and simple.

According to the present invention, this has been achieved by providing that the vibration damping is performed actively, with a measured state value of the driven component or one reconstructed by means of an observer is determined, with the state value being entered into a damping regulator, which regulator acts on drive of the driven elements, with a damping regulating circuit being provided in addition to a position regulating circuit.

By providing active vibration damping that is implemented by a damping regulating circuit in addition to a position regulating circuit, complex mechanical devices can be completely eliminated since the vibration damping is accomplished by directly influencing the drive of the driven components.

To determine the movement of the center of the transfer rails that can occur, for example, during vibration, a state value or characterizing value of the driven element is determined directly or indirectly. This value is fed into the damping regulator and used as a measured value for the damping regulation and is evaluated by the latter.

BRIEF DESCRIPTION OF THE DRAWINGS

These and other objects, features and advantages of the present invention will become more apparent from the following detailed description thereof when taken in conjunction with the accompanying drawings wherein:

FIG. 1 is a schematic circuit diagram of a first embodiment of the present invention;

FIG. 2 is a schematic circuit diagram of a second embodiment of the present invention;

FIG. 3 is a schematic circuit diagram of a third embodiment of the present invention.

DETAILED DESCRIPTION OF THE DRAWINGS

Figure 4:
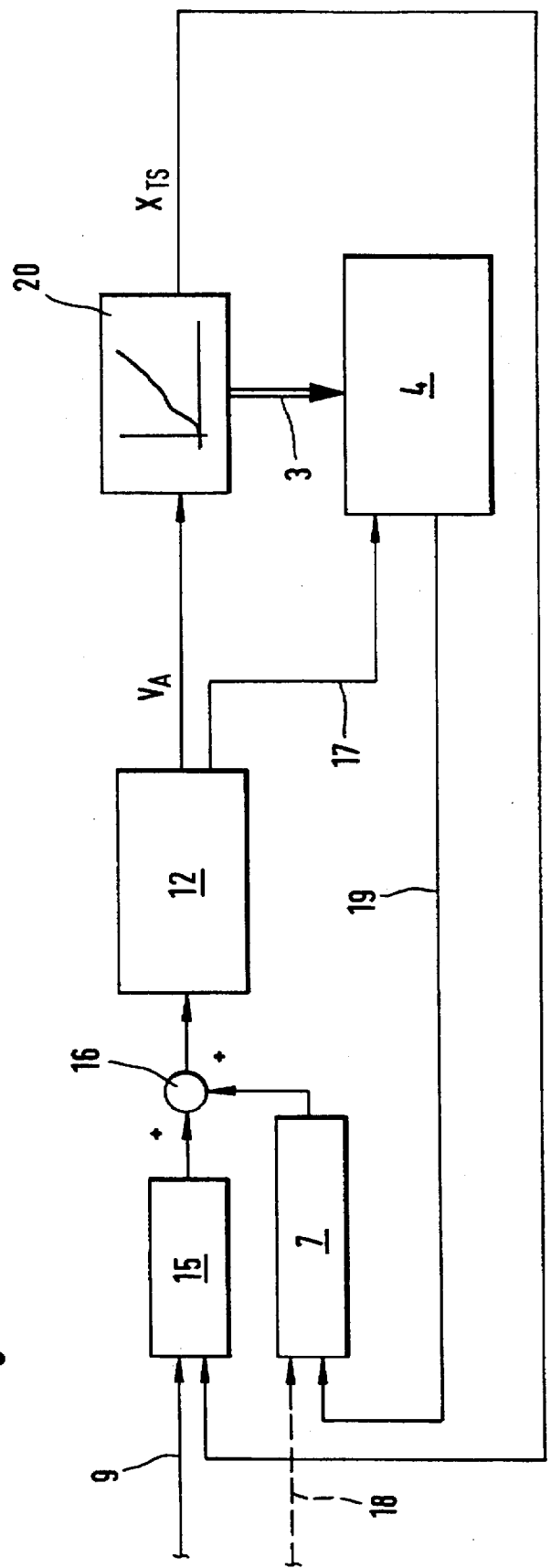
FIG. 4 is a schematic circuit diagram of a fourth embodiment of the present invention.

An electrical drive 1 with position regulation, with direct and/or indirect position determination, drives, for example, a transfer rail in a press system, with the transfer rail being capable of vibrating because of its movements. The behavior of the transfer rail as it vibrates is shown schematically in FIG. 1 by reference numeral 2. Drive 1 moves the transfer rail into a drive position $x_A$, but because of the vibrations that occur, the center of the transfer rail is not in position $x_A$, but in a different position $x_{TS}$.

The state values of the transfer rail, i.e., for example, the acceleration of the transfer rail, are read into an observer 4.

The goal of observer 4 is to calculate the characterizing values of a system that cannot be measured directly or are not measured, in other words state values 3. By using observer 4, for example, the use of costly sensors can be eliminated. A regulation-engineering model of the system to be observed, in this case the transfer rail, is used in observer 4.

At the same time, the set or actual value of drive speed 5 of drive 1 is read into observer 4. From these state values 3 as well as the set value or actual value of drive speed 5, the observer 4 determines or implements an observed speed 6 of the middle of the transfer rail. The observed speed 6 is entered into a damping regulator 7, with the guide speed 8 also being entered as an additional input value, as indicated by the dashed line in FIG. 1.

Guide speed 8 is the speed that serves as the basis for determining a position guidance value 9. Guide speed 8 is based on the programmed law of motion for the workpiece transport device, and the time or guide angle therefor. Damping regulator 7 calculates the required values for damping the vibration of the transfer rail. The value determined by damping regulator 7 then influences drive 1.

In addition, position guidance parameter 9 is provided as an input value for drive 1. Position guidance value 9 represents the position set point for each of the three (for example) axes of the transfer rail. The position check point of each axis is determined from the programmed law of motion of the programmed starting and end positions of the transfer rail as well as the time or a guide angle.

In the embodiment according to FIG. 1, therefore, the observed speed 6 of the middle of the transfer rail is fed back into damping regulator 7, which influences drive 1, so that active vibration damping is provided. Damping regulator 7 is configured, for example, as a proportional regulator.

The second embodiment of the present invention shown in FIG. 2 uses the same reference numerals already used in connection with FIG. 1 to describe the same elements. In contrast to the embodiment in FIG. 1, however, an observer 4 is not used, i.e. the measured state values 3 are read into a device 10 for determining the speed of the middle of the transfer rail.

Device 10 for determining the speed of the middle of the transfer rail has as its direct output value the speed 11 of the middle of the transfer rail that is read into damping regulator 7. The guide speed 8 can also be entered into damping regulator 7. Position guiding value 9 as well as the value determined in damping regulator 7 are also entered for drive 1, which is likewise made in the form of a drive with position regulation using direct and/or indirect position determination. As a result, damping regulator 7 influences drive 1, so that the vibrations of the transfer rail are damped.

In contrast to the embodiment in FIG. 1, in which the observed speed of the middle of the transfer rail is fed back to damping regulator 7, the embodiment shown in FIG. 2 feeds back the speed of the middle of the transfer rail, which is determined in device 10 for determining the speed of the middle of the transfer rail without using an observer, into damping regulator 7. In the embodiments of both FIGS. 1 and 2 the damping regulating circuit is superimposed on the position regulating circuit.

FIG. 3 shows a third embodiment in which an electrical drive 12 with speed regulation is operated at a drive speed $v_A$. Because of drive speed $v_A$, a transfer rail 20 can vibrate. In contrast to the embodiments in FIGS. 1 and 2, the speed of the transfer rail is used as state value 3 in the embodiment of FIG. 3 where the position of the middle of the transfer rail is characterized by the symbol $x_{TS}$.

State values 3 are measured on transfer rail 20, from which values the acceleration of the middle of the transfer rail is determined in a device 13. The value 14 of the determined acceleration of the middle of the transfer rail is entered in damping regulator 7, and the guidance acceleration 18 can also be entered into damping regulator 7. In addition to damping regulator 7, a position regulator 15 is provided in the present embodiment, in which the position $x_{TS}$ of the middle of the transfer rail as well as guide value are entered.

In position regulator 15, from the measured actual position of the transfer rail and the determined position guidance value 9, a component of the speed set point for transfer rail 2 is determined, i.e. a rotational speed set point for drive 12 is determined, which is then passed on to a device 16. The output values of both position regulator 15 and damping regulator 7 are combined in device 16 for the speed set point that influences drive 12 of transfer rail 2. As a result the vibrations of transfer rail 2 are actively damped.

In the embodiment of FIG. 3, the position regulating circuit is superimposed on the damping regulating circuit. Alternatively, however, provision can be made such that the damping regulating circuit is superimposed on the position regulating circuit.

FIG. 4 shows another embodiment similar to that of FIG. 3 but, instead of device 13 for determining the acceleration of the middle of the transfer rail, an observer 4 can be used to determine the observed acceleration 19 of the middle of the transfer rail and then to pass this value to damping regulator 7.

Provision is also made in the embodiment of FIG. 4 such that the set value or actual value 17 of the drive speed of drive 12 is entered into observer 4 for the acceleration of the middle of the transfer rail. In addition, the guide speed 18 can be read into damping regulator 7. The remaining configuration and function of the embodiment shown in FIG. 4 otherwise substantially correspond to the embodiment of FIG. 3.

The entire regulating system, as described in the embodiments of FIGS. 1 to 4, can be built in a microcomputer or microprocessor, with the vibrational behavior of the transfer rail being described by a second-order differential equation. The microprocessor or microcomputer can be part of a numerical control or a drive amplifier, or the functions can be distributed over both systems, each of which has a microcomputer.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A method for actively performing vibration damping of driven elements of a workpiece transport device component in and on press and punch machines, comprising the steps of moving the component from one position to another for workpiece transport with occurrence of vibrations caused by moving the component, operatively associating a position regulating circuit with the component entering at least one measured state value of the moving component and a reconstructed state value into an observer, determining in the observer a regulator value based on the measured and reconstructed state values entering the regulator value into a damping regulator, and operatively associating a damping regulating circuit with the position regulating circuit so as to permit the damping regulator to dampen vibrations on the component caused by the moving from the one position to another position.

2. The method according to claim 1, wherein additional state values are inputted to the observer.

3. The method according to claim 1, wherein one of a set point and actual value of drive speed of the driven elements is entered into the observer.

4. The method according to claim 3, wherein additional state values are inputted to the observer.

5. The method according to claim 1, wherein the damping regulating circuit is superimposed on the position regulating circuit.

6. The method according to claim 1, wherein the position regulating circuit is superimposed on the damping regulating circuit.

7. The method according to claim 1, wherein one of guide speed and guide acceleration of the driven elements is entered into the damping regulator as an additional input value.

8. The method according to claim 7, wherein additional state values are used as measured values for the observer.

9. The method according to claim 7, wherein the damping regulating circuit is superimposed on the position regulating circuit.

10. The method according to claim 7, wherein the position regulating circuit is superimposed on the damping regulating circuit.

* * * * *